UNITED STATES PATENT OFFICE.

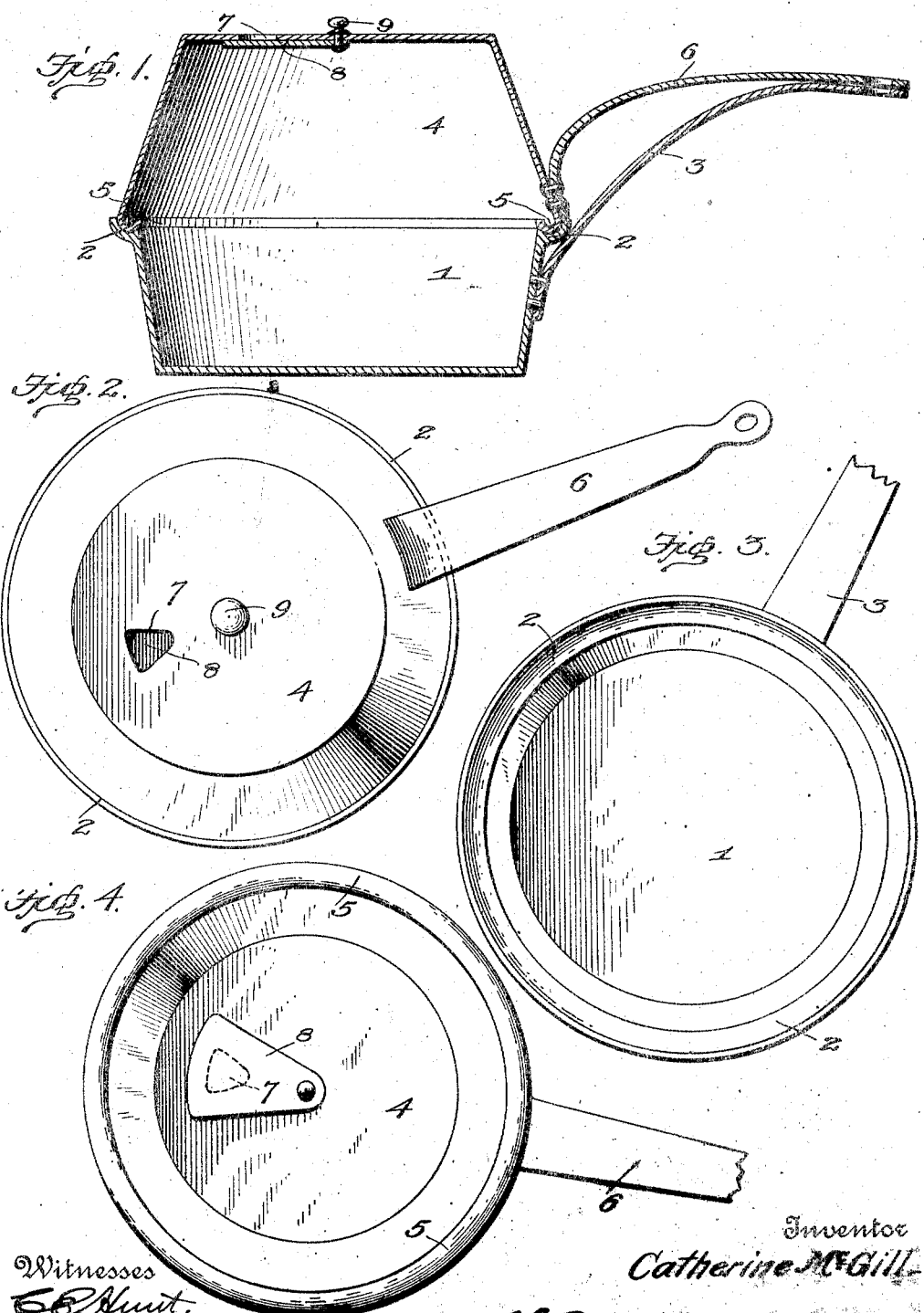

CATHERINE McGILL, OF CHICAGO, ILLINOIS.

COOKING UTENSIL.

966,946.   Specification of Letters Patent.   Patented Aug. 9, 1910.

Application filed February 15, 1910. Serial No. 543,920.

*To all whom it may concern:*

Be it known that I, CATHERINE McGILL, a subject of the King of England, residing at Chicago, in the county of Cook and State of Illinois, have invented certain new and useful Improvements in Cooking Utensils; and I do declare the following to be a full, clear, and exact description of the invention, such as will enable others skilled in the art to which it appertains to make and use the same.

This invention relates to improvements in cooking utensils and particularly to frying and baking pans.

The object of the invention is to provide a pan of this character in which the grease in spluttering and splashing from the pan during the use of the same will be caught and prevented from dropping onto the stove.

With the foregoing and other objects in view, the invention consists of certain novel features of construction, combination and arrangement of parts, as will be more fully described and particularly pointed out in the appended claims.

In the accompanying drawings, Figure 1 is a vertical sectional view of my improved frying or baking pan; Fig. 2 is a top plan view of the same; Fig. 3 is a plan view of the pan with the cover section removed; Fig. 4 is a plan view of the inner side of the cover of the pan.

Referring more particularly to the drawings, 1 denotes the bottom or receptacle portion of my improved pan. Around the upper edge of the sides of the pan, is formed a radially projecting grooved annular flange 2, the purpose of which will hereinafter appear. Secured to one side of the pan, is a handle 3 which preferably curves upwardly and outwardly, as shown.

Adapted to be engaged with the bottom section of the pan is a cover section 4, said cover being preferably of frusto-conical shape and provided on its lower edge with an inwardly projecting grooved flange 5 which forms an annular channel, the purpose of which will be hereinafter described. The cover 4 is also provided with a handle 6, which, when the cover is in place, is preferably disposed immediately above the handle 3 of the pan bottom, so that both handles may be grasped together when it is desired to lift the pan. In the top of the cover section 4, is formed a steam outlet passage 7 which is adapted to be opened and closed by a valve plate 8 which is secured to the inner end of a knob 9, which is revolubly mounted in and projects beyond the outer side of the top of the cover, as shown.

When the cover section is in place on the bottom of the pan, the flanged lower edge of the cover engages and rests in the grooved flange on the sides of the pan which forms a seat for the top. By providing the pan with the cover as herein shown and described, any grease spluttering or flying from the pan when in use will be caught by the cover and will run down the sides of the same into the channel formed by the grooved flange 5, thus preventing this grease from dropping onto the stove. When the pan is used for baking purposes, the valve plate 8 is turned to open the outlet passage 7, thus permitting the steam to escape from the pan.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a cooking utensil of the character described, a bottom section or receptacle, a grooved annular flange formed around the upper edge of said bottom, a removable cover section adapted to be engaged with said bottom section, an inwardly projecting grooved flange arranged on the lower edge of said cover section to form an annular grease receiving channel, and a steam discharge valve arranged in the top of said cover section.

2. In a cooking utensil of the character described, a pan or receptacle having a grooved annular flange formed upon the upper edge thereof, a removable cover section having an inwardly projecting grooved flange arranged on its lower end and adapted to be engaged in the grooved flange of the receptacle and forming an annular grease receiving channel, a steam discharge opening in the cover section, and a pivoted cover plate adapted to close said opening.

In testimony whereof I have hereunto set may hand in presence of two subscribing witnesses.

CATHERINE McGILL.

Witnesses:
 JOHN McGILL,
 JOHN McCOY.